United States Patent
Yi et al.

(10) Patent No.: US 10,057,032 B2
(45) Date of Patent: Aug. 21, 2018

(54) METHOD AND DEVICE FOR TRANSMITTING DATA FOR HALF-DUPLEX DEVICE

(71) Applicant: LG ELECTRONICS INC., Seoul (KR)

(72) Inventors: Yunjung Yi, Anyang-si (KR); Dongyoun Seo, Anyang-si (KR); Suckchel Yang, Anyang-si (KR); Joonkui Ahn, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 83 days.

(21) Appl. No.: 14/389,217

(22) PCT Filed: Mar. 28, 2013

(86) PCT No.: PCT/KR2013/002590
§ 371 (c)(1),
(2) Date: Sep. 29, 2014

(87) PCT Pub. No.: WO2013/147528
PCT Pub. Date: Oct. 3, 2013

(65) Prior Publication Data
US 2015/0016310 A1 Jan. 15, 2015

Related U.S. Application Data

(60) Provisional application No. 61/616,427, filed on Mar. 28, 2012.

(51) Int. Cl.
*H04L 1/08* (2006.01)
*H04L 5/16* (2006.01)
(Continued)

(52) U.S. Cl.
CPC .......... *H04L 5/0053* (2013.01); *H04B 7/2615* (2013.01); *H04B 7/2656* (2013.01); *H04L 1/08* (2013.01); *H04L 5/16* (2013.01)

(58) Field of Classification Search
CPC ....... H04B 7/2615; H04B 7/2656; H04L 1/08; H04L 5/0053; H04L 5/16
(Continued)

(56) References Cited

U.S. PATENT DOCUMENTS

2009/0180402 A1 7/2009 Lindoff et al.
2010/0027447 A1* 2/2010 Choi ..................... H04L 5/0053
370/280

(Continued)

FOREIGN PATENT DOCUMENTS

KR 10-2012-0023004 A 3/2012
WO WO 2010/124033 A3 10/2010

OTHER PUBLICATIONS

LTE_SRG: The LTE Standard, Developed by a global community to support paired and unpaired spectrum deployments, Apr. 2014, foot note: 2 RP-050155, "Agreed Text Proposals for the Requirement TR," 3GPP RAN Rapporteur, Mar. 2005.*
(Continued)

*Primary Examiner* — Huy D Vu
*Assistant Examiner* — Nizam Ahmed
(74) *Attorney, Agent, or Firm* — Birch, Stewart, Kolasch & Birch, LLP

(57) ABSTRACT

A method for transmitting data for a half-duplex device in a wireless communication system is provided. The half-duplex device receives first downlink control information from a base station in a first subframe. The half-duplex device transmits uplink data to the base station in a second subframe. The first downlink control information includes a
(Continued)

resource through which the uplink data is transmitted and information on the second subframe.

4 Claims, 11 Drawing Sheets

(51) Int. Cl.
  *H04L 5/00* (2006.01)
  *H04B 7/26* (2006.01)
(58) Field of Classification Search
  USPC .......................................................... 370/277
  See application file for complete search history.

(56) References Cited

U.S. PATENT DOCUMENTS

| | | | | |
|---|---|---|---|---|
| 2010/0085901 A1* | 4/2010 | Womack | ............. | H04B 7/2656 |
| | | | | 370/278 |
| 2010/0290509 A1 | 11/2010 | Dalsgaard et al. | | |
| 2010/0322097 A1* | 12/2010 | Jen | ........................ | H04L 1/1854 |
| | | | | 370/252 |
| 2011/0107170 A1* | 5/2011 | Park | ...................... | H04L 1/1854 |
| | | | | 714/749 |
| 2013/0090517 A1* | 4/2013 | Van den Heuvel | .............. | A61N 1/37264 |
| | | | | 600/25 |
| 2013/0121186 A1* | 5/2013 | Vajapeyam | ......... | H04W 72/085 |
| | | | | 370/252 |
| 2013/0250772 A1* | 9/2013 | Yin | ...................... | H04L 1/1822 |
| | | | | 370/241 |

OTHER PUBLICATIONS

LTE_SRG (NPL Document—RP-050155, "Agreed Text Proposals for the Requirement TR," 3GPP RAN Rapporteur, Mar. 2005.*
Baker, "LTE-Advanced Physical Layer", REV-090003r1, IMT-Advanced Evaluation Workshop, Dec. 17-18, 2009, pp. 1-49.

* cited by examiner

METHOD AND DEVICE FOR TRANSMITTING DATA FOR HALF-DUPLEX DEVICE

CROSS REFERENCE TO RELATED APPLICATIONS

This application is the National Phase of PCT International Application No. PCT/KR2013/002590, filed on Mar. 28, 2013, which claims priority under 35 U.S.C. 119(e) to U.S. Provisional Application No. 61/616,427, filed on Mar. 28, 2012. All of which are hereby expressly incorporated by reference into the present application.

BACKGROUND OF THE INVENTION

Field of the Invention

The present invention relates to wireless communication and, more particularly, to a method and apparatus for transmitting data for a half-duplex device in a Frequency Division Duplex (FDD) system.

Related Art $3^{rd}$ Generation Partnership Project (3GPP) Long Term Evolution (LTE) is an improved type of a Universal Mobile Telecommunication System (UMTS) and is introduced as 3GPP release 8. 3GPP LTE uses Orthogonal Frequency Division Multiple Access (OFDMA) in downlink and uses Single Carrier-Frequency Division Multiple Access (SC-FDMA) in uplink. 3GPP LTE-advanced (LTE-A), that is, an advanced type of 3GPP LTE, is recently being discussed.

A communication channel between a base station and a terminal is basically divided into a downlink (DL) channel from the base station to the terminal and an uplink (UL) channel from the terminal to the base station.

In 3GPP LTE and LTE-A systems, a method of transmitting data includes a Frequency Division Duplex (FDD) method and a Time Division Duplex (TDD) method. The FDD method means that uplink transmission and downlink transmission are performed at the same time while occupying different frequency bands. The TDD method means that uplink transmission and downlink transmission are performed at different times while occupying the same frequency band.

In order for a terminal to perform uplink transmission and downlink reception at the same time, the terminal needs to have a full-duplex capability. A terminal incapable of performing uplink transmission and downlink reception at the same time is called a half-duplex device compared to a full-duplex device. The half-duplex device is advantageous in that it has low hardware complexity and has a low price compared to a full-duplex device. In particular, a half-duplex device is advantageous in terms of the price if the size of transmitted and received data is not great and the size of transmitted data is much greater than that of received data as in a Machine Type Communication (MTC) device.

In order for a half-duplex device to efficiently use radio resources, however, a base station is required to schedule radio resources so that the half-duplex device does not perform uplink transmission and downlink reception at the same time. In the FDD method of 3GPP LTE and LTE-A systems, a terminal is assumed to basically have a full-duplex capability, which may be additional scheduling overhead to a base station. In particular, if the number of half-duplex devices served by a single base station is many, a scheduling overhead problem may become serious. Accordingly, there is a need for a method of scheduling resources, which supports a half-duplex device, which is more flexible, and which has low overhead.

SUMMARY OF THE INVENTION

An object of the present invention is to provide a method of transmitting data for a half-duplex device in a Frequency Division Duplex (FDD) system and an apparatus using the same.

Another object of the present invention is to provide a method of allocating radio resources for a half-duplex device in an FDD system and an apparatus using the same.

In aspect, a method for transmitting data by a half-duplex device in a wireless communication system is provided. The method includes receiving, by the half-duplex device, first downlink (DL) control information from a base station in a first subframe, and transmitting, by the half-duplex device, uplink data to the base station in a second subframe. The first DL control information comprises information about resources and the second subframe in which the uplink data is transmitted.

The second subframe may be indicated by an offset value based on an index of the first subframe.

The second subframe may be spaced apart from the first subframe at an interval of 4 ms or 5 ms.

The second subframe may be spaced apart from the first subframe at an interval of 4 ms, 5 ms, 6 ms, or 7 ms.

The method may further include receiving, by the half-duplex device, a retransmission request for the uplink data from the base station in a third subframe, and retransmitting, by the half-duplex device, the uplink data to the base station in a fourth subframe.

The retransmission request may comprises information about resources in which the uplink data is retransmitted.

The retransmission request may comprise information about the fourth subframe. The fourth subframe may be indicated by an offset value based on an index of the third subframe.

The fourth subframe may be spaced apart from the third subframe at an interval of 4 ms or 5 ms.

The fourth subframe may be spaced apart from the third subframe at an interval of 4 ms, 5 ms, 6 ms, or 7 ms.

The half-duplex device may support a bandwidth of 1.4 MHz.

In another aspect, a half-duplex device in a wireless communication system includes a Radio Frequency (RF) unit configured to transmit and receive radio signals, and a processor connected to the RF unit and configured to receive first downlink (DL) control information from a base station in a first subframe, and transmit uplink data to the base station in a second subframe. The first DL control information comprises information about resources and the second subframe in which the uplink data is transmitted.

The scheduling of radio resources can be flexibly performed.

Complexity of the scheduling of radio resources can be reduced.

Efficiency of the scheduling of radio resources can be improved.

The performance of a half-duplex device in a Frequency Division Duplex (FDD) system is improved.

DESCRIPTION OF EXEMPLARY EMBODIMENTS

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). IEEE 802.16m is the evolution of IEEE 802.16e, and it provides backward compatibility with systems based on IEEE 802.16e. UTRA is part of a Universal Mobile Telecommunications System (UMTS). $3^{rd}$ Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

User Equipment (UE) may be fixed or mobile and may also be called another terminology, such as a Mobile Station (MS), a Mobile Terminal (MT), a User Terminal (UT), a Subscriber Station (SS), a wireless device, a Personal Digital Assistant (PDA), a wireless modem, or a handheld device.

In general, a Base Station (BS) refers to a fixed station communicating with UE. The BS may also be called another terminology, such as an evolved-NodeB (eNB), a Base Transceiver System (BTS), or an access point.

Hereinafter, the application of the present invention based on 3GPP LTE based on 3GPP release 8 is described. This application is illustrative, and the present invention may be applied to a variety of wireless communication networks. LTE hereinafter includes LTE and/or LTE-A.

Figure 1:
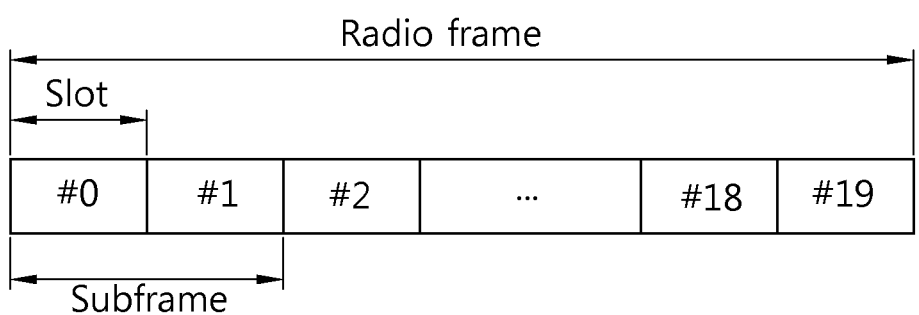
FIG. 1 illustrates the configuration of a radio frame in 3rd Generation Partnership Project (3GPP) Long Term Evolution (LTE).

FIG. 1 illustrates the configuration of a radio frame in 3rd Generation Partnership Project (3GPP) Long Term Evolution (LTE).

For the structure, reference may be made to 3rd Generation Partnership Project (3GPP) TS 36.211 V10.4.0 (2011-12) "Technical Specification Group Radio Access Network; Evolved Universal Terrestrial Radio Access (E-UTRA); Physical channels and modulation (Release 10)".

Referring to FIG. 1, the radio frame includes 10 subframes. A single subframe includes two contiguous slots. The slots within the radio frame are assigned slot numbers #0 to #19. The time that is taken to send a single subframe is called a Transmission Time Interval (TTI). The TTI may be a scheduling unit for data transmission. For example, the length of a single radio frame may be 10 ms, the length of a single subframe may be 1 ms, and the length of a single slot may be 0.5 ms.

A single slot includes a plurality of Orthogonal Frequency Division Multiplexing (OFDM) symbols in a time domain and includes a plurality of subcarriers in a frequency domain. The OFDM symbol is for representing a single symbol period because 3GPP LTE uses OFDMA in downlink and may be called another terminology depending on multiple access methods. For example, if SC-FDMA is used as an uplink multiple access scheme, an OFDM symbol may be called an SC-FDMA symbol. A Resource Block (RB) is a resource allocation unit, and the RB includes a plurality of contiguous subcarriers in a single slot.

The structure of the radio frame shown in FIG. 1 is only an example. Accordingly, the number of subframes included in a radio frame, the number of slots included in a subframe, or the number of OFDM symbols included in a slot may be changed in various ways. In 3GPP LTE, a single slot is defined to include 7 OFDM symbols in a normal Cyclic Prefix (CP), and a single slot is defined to include 6 OFDM symbols in an extended CP.

Figure 2:
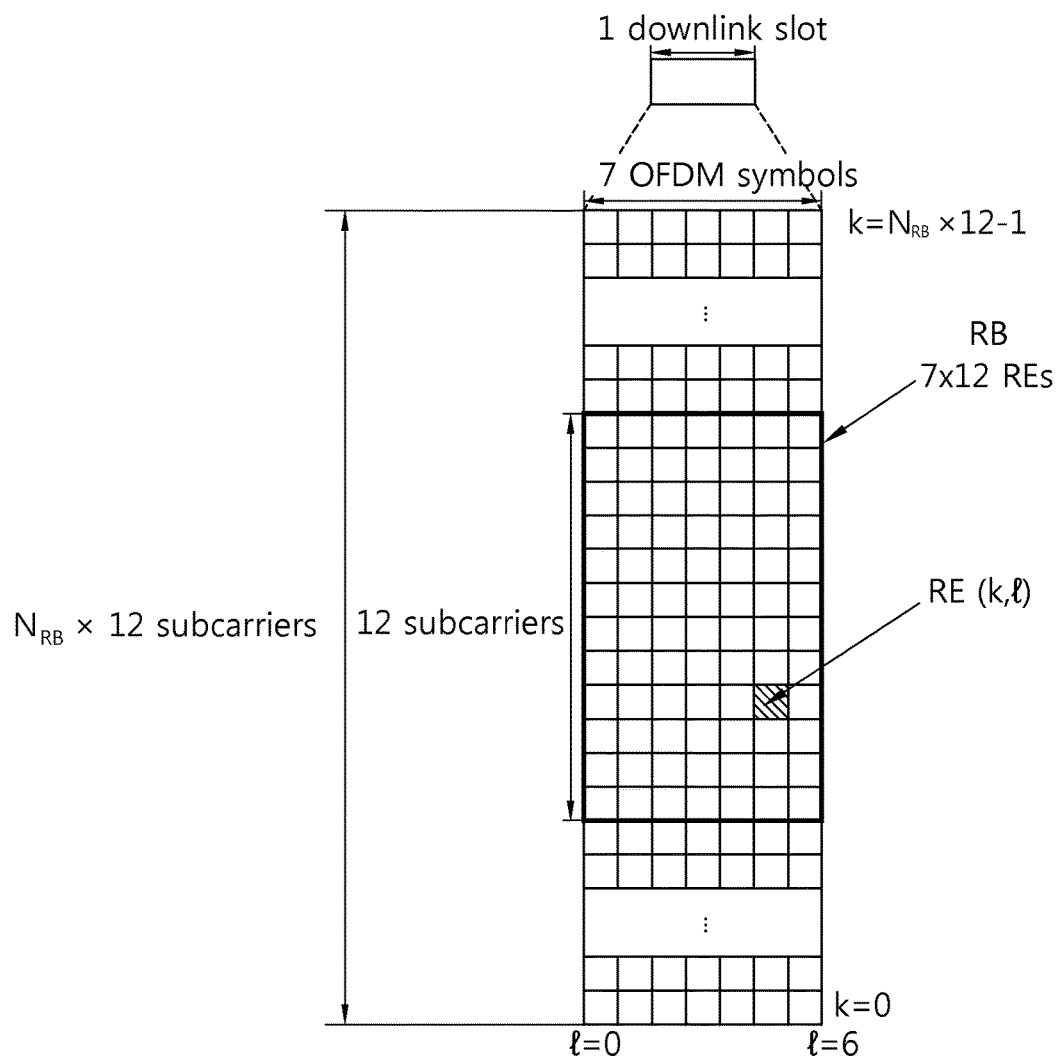
FIG. 2 illustrates an example of the resource grid of a single downlink slot.

FIG. 2 illustrates an example of the resource grid of a single downlink slot.

The downlink slot includes a plurality of OFDM symbols in a time domain and includes an $N_{RB}$ number of RBs in a frequency domain. The number of RBs $N_{RB}$ included in a downlink slot depends on a downlink transmission bandwidth configured in a cell. For example, in an LTE system, the number of RBs $N_{RB}$ may be any a single of 60 to 110. A single RB includes a plurality of subcarriers in a frequency domain. An uplink slot may have the same structure as the downlink slot.

Each element on the resource grid is referred to as a Resource Element (RE). The RE on the resource grid may be identified by an index pair (k,l) within a slot. In this case, k (k=0, . . . , $N_{RB} \times 12-1$) is a subcarrier index in a frequency domain, and l (l=0, . . . , 6) is an OFDM symbol index in a time domain.

In this case, a single RB is illustrated as including 7×12 REs, including 7 OFDM symbols in a time domain and 12 subcarriers in a frequency domain, but the number of OFDM symbols and the number of subcarriers within an RB are not limited thereto. The number of OFDM symbols and the number of subcarriers may be changed in various ways depending on the length of a CP, frequency spacing, etc.

Figure 3:
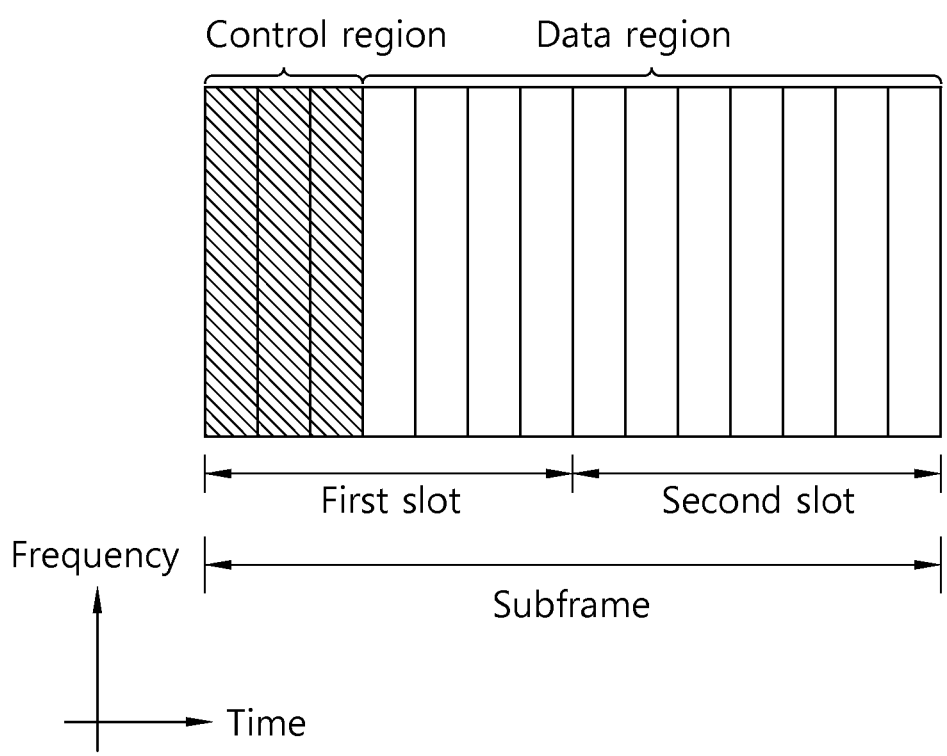
FIG. 3 illustrates the configuration of a downlink subframe.

FIG. 3 illustrates the configuration of a downlink subframe.

The downlink (DL) subframe is divided into a control region and a data region in a time domain. The control region includes a maximum of former 3 OFDM symbols in a first slot within the DL subframe, but the number of OFDM symbols included in the control region may be changed.

Control channels different from a physical downlink control channel (PDCCH) are allocated to the control region, and PDSCHs are allocated to the data region.

As disclosed in 3GPP TS 36.211 V10.4.0, in 3GPP LTE/LTE-A, the control channel may include a PDCCH, a physical control format indicator channel (PCFICH), and a physical hybrid-ARQ indicator channel (PHICH).

A physical control format indicator channel (PCFICH) transmitted in the first OFDM symbol of a subframe carries a Control Format Indicator (CIF) indicative of the number of OFDM symbols (i.e., the size of a control region) used to transmit control channels within the subframe. UE may receive a CIF on a PCFICH and then monitor a PDCCH. The PCFICH is transmitted through the fixed PCFICH resources of the subframe without using blind decoding.

A PHICH carries positive-acknowledgement (ACK)/ negative-acknowledgement (NACK) signals for a uplink Hybrid Automatic Repeat Request (HARQ). The ACK/ NACK signal of uplink (UL) data on a PUSCH transmitted by UE is transmitted through a PHICH.

A physical broadcast channel (PBCH) is transmitted in the former 4 OFDM symbols of a second slot in the first subframe of a radio frame. The PBCH carries system information that is essential for UE to communicate with a BS, and system information transmitted through the PBCH is called a Master Information Block (MIB). In contrast, system information transmitted on a PDSCH indicated by a PDCCH is called a System Information Block (SIB).

A PDCCH occupies a maximum of four OFDM symbols in the time domain and is transmitted over the entire system band in the frequency domain. Control information transmitted through a PDCCH is called Downlink Control Information (DCI). DCI may include information about the resource allocation of a PDSCH (this is also called a DL grant), the resource allocation of a PUSCH (this is also called an UL grant), a set of transmit power control commands for each UE within a specific UE group, and/or the activation of a Voice over Internet Protocol (VoIP).

In 3GPP LTE, blind decoding is used to detect a PDCCH. Blind decoding is a method of demasking a desired identifier to the CRC of a received PDCCH (this is called a candidate PDCCH) and determining whether or not a corresponding PDCCH is its own control channel by checking a CRC error.

A BS determines a PDCCH format based on DCI to be transmitted to UE, attaches a Cyclic Redundancy Check (CRC) to the DCI, and masks a unique identifier (this is also called a Radio Network Temporary Identifier (RNTI)) the CRC depending on the owner or use of a PDCCH.

A control region within a subframe includes a plurality of Control Channel Elements (CCEs). The CCE is a logical allocation unit used to provide a PDCCH with a coding rate depending on the state of a radio channel, and the CCE corresponds to a plurality of Resource Element Groups (REGs). The REG includes a plurality of REs. The format of a PDCCH and the number of bits of an available PDCCH are determined depending on association between the number of CCEs and a coding rate provided by the CCEs.

A single REG includes 4 Res, and a single CCE includes 9 REGs. In order to configure a single PDCCH, {1, 2, 4, 8} CCEs may be used. Each of the elements of {1, 2, 4, 8} is called a CCE aggregation level.

The number of CCEs used to send a PDDCH is determined by a BS depending on a channel state. For example, UE having a good DL channel state may use a single CCE to send a PDCCH. UE having a poor DL channel state may use 8 CCEs to send a PDCCH.

A control channel including one or more CCEs is mapped to physical resources, after interleaving is performed in unit of an REG and cyclic shift based on a cell identifier (ID) is then performed.

Figure 4:
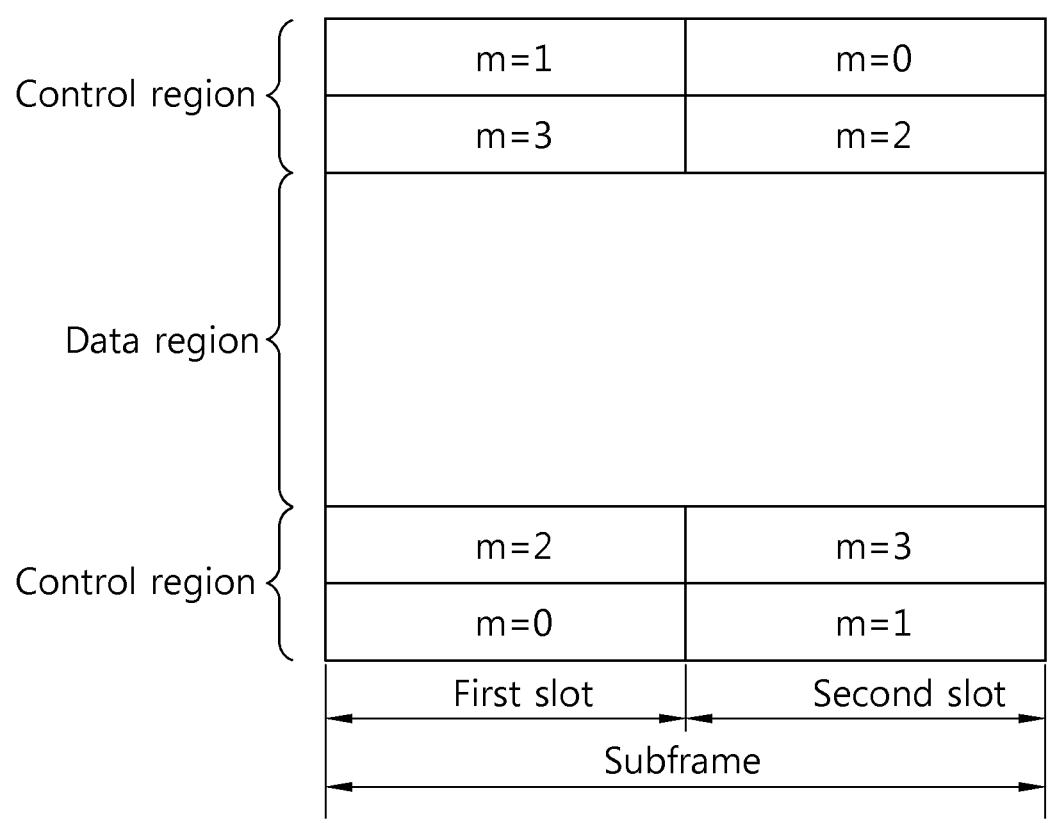
FIG. 4 illustrates the configuration of an uplink subframe.

FIG. 4 illustrates the configuration of an uplink subframe.

The uplink subframe may be divided into a control region and a data region in a frequency domain. Physical uplink control channels (PUCCHs) on which uplink control information is transmitted are allocated to the control region. Physical uplink shared channels (PUSCHs) on which data is transmitted are allocated to the data region.

A PUCCH for a single piece of UE is allocated in the form of a single PRB pair in a subframe. RBs belonging to a single PRB pair occupy different subcarriers in a first slot and a second slot. A frequency occupied by RBs that belong to an RB pair allocated to a PUCCH is changed based on a slot boundary. This is said that a PRB pair allocated to a PUCCH has been frequency-hopped at the slot boundary. UE may obtain a frequency diversity gain by sending uplink control information through different subcarriers over time. m is a location index indicative of the logical frequency domain location of an RB pair allocated to a PUCCH in a subframe.

Uplink control information transmitted on a PUCCH includes Hybrid Automatic Repeat Request (HARQ) acknowledgement (ACK), a Channel Quality Indicator indicative of a DL channel state, and a Scheduling Request that is an uplink radio resource allocation request.

Meanwhile, a demand for a high data transfer rate is increased, and thus a Carrier Aggregation (CA) supporting a plurality of cells may be applied in 3GPP LTE-A. A CA may also be called another term, such as a bandwidth aggregation. A CA means that a wireless communication system forms a broadband by collecting one or more carriers each having a bandwidth smaller than a broadband, that is, a target, when trying to support the broadband. Carriers, that is, a target, when one or more carriers are collected, may use bandwidths used in an existing system for the purpose of backward compatibility with the existing system. For example, in 3GPP LTE, bandwidths, such as 1.4 MHz, 3 MHz, 5 MHz, 10 MHz, 15 MHz, and 20 MHz, may be supported. In 3GPP LTE-A, a broadband of 20 MHz or higher may be configured using only the bandwidths of a 3GPP LTE system. Alternatively, new bandwidths may be defined without using the bandwidths of existing systems, and a broadband may be configured using the new bandwidths.

A plurality of BSs and a plurality of pieces of UE may communicate with each other through a maximum of 5 cells. The 5 cells may correspond to a bandwidth of a maximum of 100 MHz. That is, a CA environment indicates that specific UE has two or more configured serving cells (hereinafter called cells) having different carrier frequencies. The carrier frequency indicates the center frequency of a cell.

A cell indicates a combination of DL resources and UL resources optionally. That is, a cell must include DL resources and may optionally include UL resources combined with the DL resources. The DL resource may be a DL Component Carrier (DL CC). The UL resource may be an UL CC. If specific UE has a single configured serving cell, it may have a single DL CC and a single UL CC. If specific UE has two or more cells, it may have DL CCs equal to the number of cells and UL CCs smaller than or equal to the number of cells. That is, if a CA is supported in current 3GPP LTE-A, the number of DL CCs may be always greater than or equal to the number of UL CCs. In contrast, releases subsequent to 3GPP LTE-A, a CA in which the number of DL CCs is smaller than the number of UL CCs may be supported.

Linkage between the carrier frequency of a DL CC and the carrier frequency of an UL CC may be indicated by system information transmitted on a DL CC. The system information may be System Information Block type2 (SIB2).

Figure 5:
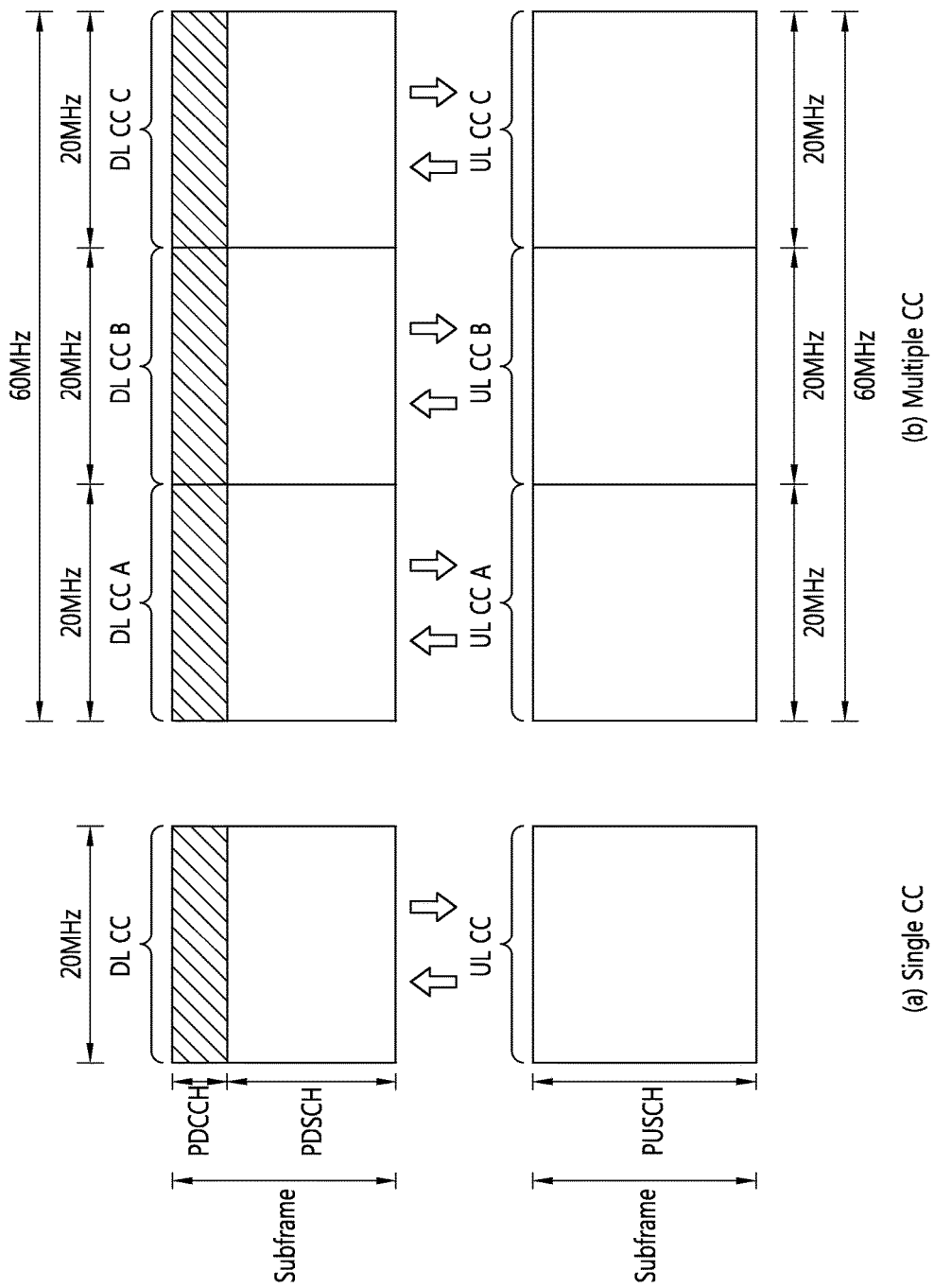
FIG. 5 illustrates an example of the structure of the subframes of a single carrier system and a carrier aggregation system.

FIG. 5 illustrates an example of the structure of the subframes of a single carrier system and a carrier aggregation system.

FIG. 5-(a) illustrates a single carrier system. A system bandwidth of FIG. 5-(a) is assumed to be 20 MHz. Since the number of carriers is 1, each of the bandwidth of a DL CC transmitted by a BS and the bandwidth of an UL CC transmitted by UE is 20 MHz. The BS performs DL transmission through the DL CC, and the UE performs UL transmission through the UL CC.

FIG. 5-(b) illustrates a carrier aggregation system. A system bandwidth of FIG. 5-(b) is assumed to be 60 MHz. A downlink bandwidth includes a DL CC A, a DL CC B, and a DL CC C each having a bandwidth of 20 MHz. An uplink bandwidth includes an UL CC A, an UL CC B, and an UL CC C each having a bandwidth of 20 MHz. A BS performs DL transmission through the DL CC A, the DL CC B, and the DL CC C, and UE performs UL transmission through the UL CC A, the UL CC B, and the UL CC C. The DL CC A and the UL CC A, the DL CC B and the UL CC B, and the DL CC C and the UL CC C may correspond to each other.

As a CA environment is introduced, cross-carrier scheduling may be applied. A PDCCH on a specific DL CC may schedule a PDSCH on any one of a plurality of DL CCs or schedule a PUSCH on any one of a plurality of UL CCs through cross-carrier scheduling. For cross-carrier scheduling, a Carrier Indicator Field (CIF) may be defined. A CIF may be included in a DCI format transmitted on a PDCCH. Whether or not the CIF is present in the DCI format may be indicated by an upper layer semi-statically or in a UE-specific way. When cross-carrier scheduling is performed, a CIF may indicate a DL CC on which a PDSCH is scheduled or an UL CC on which a PUSCH is scheduled. The CIF may have fixed 3 bits and may be present at a fixed location irrespective of the size of a DCI format. If a CIF is not present in a DCI format, a PDCCH on a specific DL CC may schedule PDSCHs on the same DL CC or schedule a PUSCH on an UL CC connected to the specific DL CC through SIB2.

If cross-carrier scheduling is performed using a CIF, a BS may assign a PDCCH monitoring DL CC aggregation in order to reduce the complexity of blind decoding by UE. The PDCCH monitoring DL CC aggregation is some of all DL CCs, and UE performs blind decoding on only PDCCHs within the PDCCH monitoring DL CC aggregation. That is, in order to schedule a PDSCH and/or a PUSCH in relation to the UE, a BS may send a PDCCH through only a DL CC within the PDCCH monitoring DL CC aggregation. The PDCCH monitoring DL CC aggregation may be configured in a UE-specific way, a UE group-specific way, or a cell-specific way.

Figure 6:
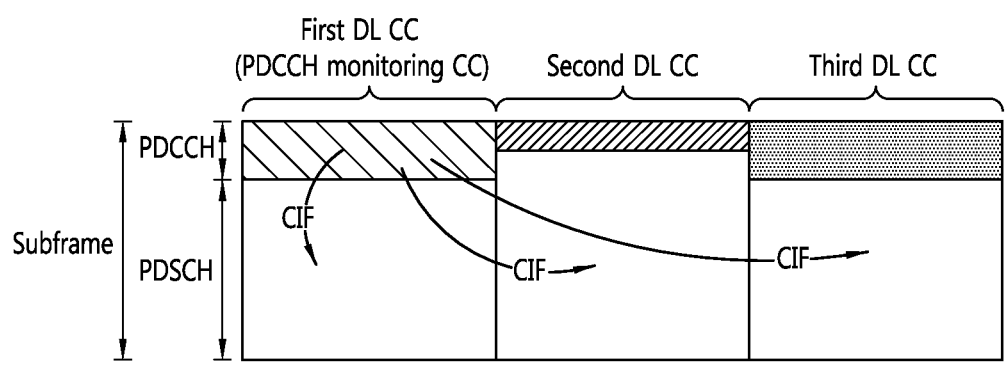
FIG. 6 illustrates an example of the structure of a subframe subject to cross-carrier scheduling through a Carrier Indicator Field (CIF) in a 3rd Generation Partnership Project (3GPP) Long Term Evolution-Advanced (LTE-A) system.

FIG. 6 illustrates an example of the structure of a subframe subject to cross-carrier scheduling through a Carrier Indicator Field (CIF) in a 3rd Generation Partnership Project (3GPP) Long Term Evolution-Advanced (LTE-A) system.

Referring to FIG. 6, the first DL CC of 3 DL CCs is configured as a PDCCH monitoring DL CC. If cross-carrier scheduling is not performed, each of the DL CCs schedules a PDSCH in order to send each PDCCH. If cross-carrier scheduling is performed, only the first DL CC configured as the PDCCH monitoring DL CC sends the PDCCH. The PDCCH transmitted on the first DL CC schedules the PDSCHs of a second DL CC and a third DL CC using a CIF in addition to the PDSCH of the first DL CC. The second DL CC and the third DL CC not configured as the PDCCH monitoring DL CC do not send a PDCCH.

Furthermore, UE may send uplink control information, such as Channel State Information (CSI) or an ACK/NACK signal received, detected, or measured from one or more DL CCs, to a BS through a predetermined single UL CC. The CSI may include a CQI, a PMI, an RI, etc. For example, if UE needs to send an ACK/NACK signal for data received from the DL CCs of a PCell and the DL CCs of an SCell, the UE may multiplex or bundle a plurality of ACK/NACK signals for the data received from each DL CC and send the plurality of ACK/NACK signals to a BS through the PUCCH of UL CCs of the PCell. In 3GPP LTE, if it is necessary to send an ACK/NACK signal for a DL CC, the following three cases are present.

1) An ACK/NACK signal for the transmission of a PDSCH indicated by a corresponding PDCCH in a subframe (n−k) may be transmitted in a subframe n. k∈K, and K is an M element aggregation $\{k_0, k_1, \ldots, k_{M-1}\}$ according to the subframe n and an UL/DL configuration. This corresponds to a case where an ACK/NACK signal for a common PDSCH is transmitted.

2) An ACK/NACK signal for the PDCCH of a subframe (n−k) indicative of the release of DL Semi-Persistent Scheduling (SPS) may be transmitted in a subframe n. k∈K, and K is an M element aggregation $\{k_0, k_1, \ldots, k_{M-1}\}$ according to the subframe n and an UL/DL configuration. An ACK/NACK signal for a PDCCH indicative of the activation of DL SPS is not transmitted.

3) An ACK/NACK signal for the transmission of a PDSCH not including a PDCCH corresponding to a subframe (n−k) may be transmitted in a subframe n. k∈K, and K is an M element aggregation $\{k_0, k_1, \ldots, k_{M-1}\}$ according to the subframe n and an UL/DL configuration. This corresponds to a case where an ACK/NACK signal for SPS is transmitted.

In the above description, K is called a bundling window. That is, the bundling window refers to one or more DL subframes corresponding to an ACK/NACK signal in a single UL subframe. In an FDD system, M=1 and K={k0}={4}.

Meanwhile, in 3GPP LTE and LTE-A systems, a method of transmitting data includes a Frequency Division Duplex (FDD) method and a Time Division Duplex (TDD) method. The FDD method means that uplink transmission and downlink transmission are performed at the same time while occupying different frequency bands. The TDD method means that uplink transmission and downlink transmission are performed at different times while occupying the same frequency band.

In order for UE to perform uplink transmission and downlink reception at the same time, the UE needs to have a full-duplex capability. UE incapable of performing uplink transmission and downlink reception at the same time is called a half-duplex device compared to a full-duplex device. The half-duplex device is advantageous in that it has low hardware complexity and has a low price compared to a full-duplex device.

Machine Type Communication (MTC) is one form of data communication including one or more entities that do not require a human being's interaction. That is, MTC refers to a concept in which a machine not UE used by a person performs communication over a network. A machine used in MTC is called an MTC device. An MTC device may not include a duplexer because it occasionally sends and receive a small amount of data. Furthermore, it might be that an MTC device will support only a narrow bandwidth (e.g., 1.4 MHz) compared to normal LTE UE.

It is assumed that UE may have a half-duplex capability in the TDD method of 3GPP LTE and LTE-A systems, but the UE has a full-duplex capability in the FDD method. In order to support half-duplex UE as in an MTC device, a BS needs to schedule radio resources so that the half-duplex UE does not perform uplink transmission and downlink reception at the same time. This may act as overhead to the BS. In particular, if a single BS serves a large number of pieces of half-duplex UE, a scheduling overhead problem may become serious. Accordingly, the present invention proposes a method of scheduling resources, which supports a half-duplex device, which is more flexible, and which has low overhead.

Hereinafter, a full-duplex device in an FDD system is called Full Duplex (FD)-FDD UE, and a half-duplex device in an FDD system is called Half Duplex (HD)-FDD UE.

In order to support HD-FDD UE, the following problems need to be solved.

(1) A gap between a DL subframe and an UL subframe

UE requires switching latency and timing advanced latency between reception RX/and transmission TX. The latency may span several OFDM symbols. The last several symbols of a DL subframe may be used as a gap prior to an UL subframe.

(2) A collision between a DL subframe and an UL subframe

A BS expects that UE has been scheduled as a DL subframe, but the UE may have been scheduled as an UL subframe.

In LTE, the problems are solved fully depending on a BS.

For example, the aforementioned gap problem may be solved by performing puncturing through the gap handling of a BS or through rate matching in a DL subframe right before an UL subframe. Alternatively, a BS may solve the gap problem by not scheduling the reception of downlink data in a DL subframe right before an UL subframe.

However, the method dependent on a BS is disadvantageous in that the flexibility of the scheduling of radio resources is low, complexity is increased, and efficiency is reduced. In particular, fixed uplink HARQ timing is a major cause of increasing the complexity of the scheduling of radio resources.

Figure 7:
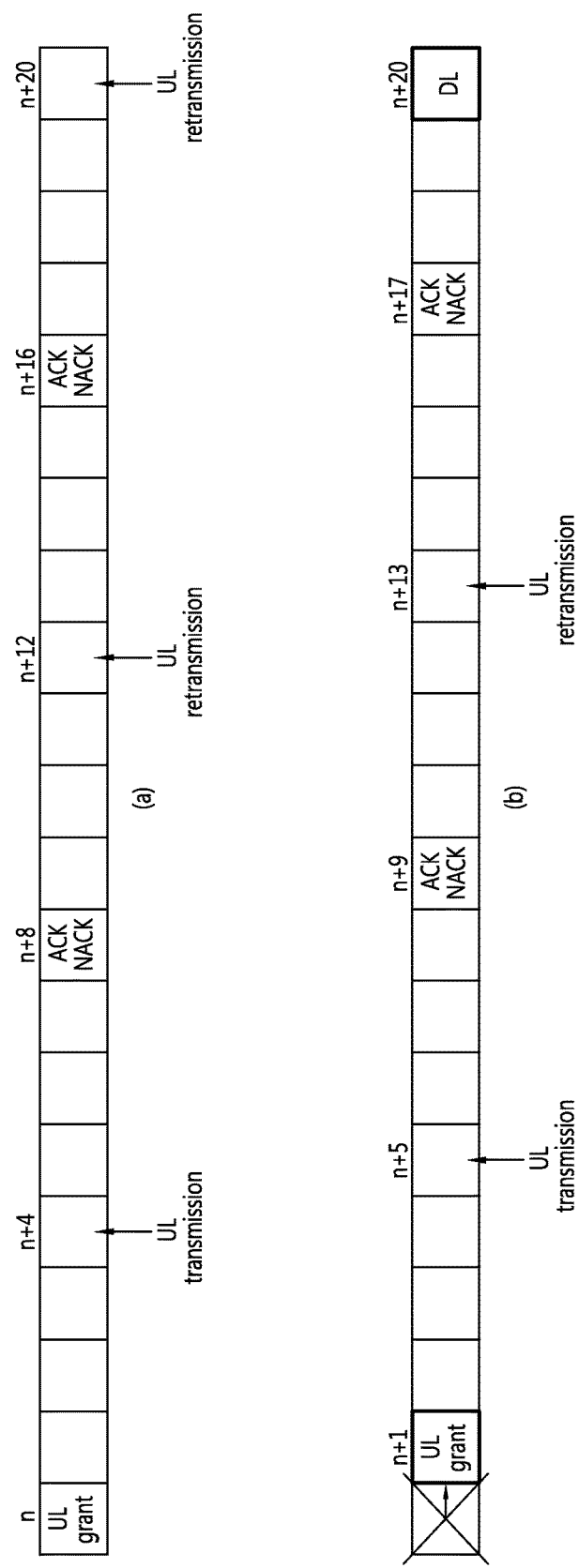
FIG. 7 is an example of the scheduling of radio resources.

FIG. 7 is an example of the scheduling of radio resources.

An uplink pattern and a downlink pattern are hereinafter combined into one and illustrated, for convenience of description. That is, if an uplink subframe and a downlink subframe are placed in the same time domain, the two subframes are placed in different frequency domains, but are illustrated as being a single subframe.

Referring to FIG. 7(a), if the transmission of a downlink control channel (e.g., a PDCCH and/or an ePDCCH) including an UL grant is scheduled in an n-th subframe, an (n+8)-th subframe and an (n+16)-th subframe are determined to be downlink subframes for ACK/NACK transmission, and an (n+4)-th subframe, an (n+12)-th subframe, and an (n+20)-th subframe are determined to be uplink subframe for (re)transmission. This means that in order to guarantee at least 3 times retransmission opportunities, a BS needs to monitor at least 20 subframes subsequent from a subframe in which an UL grant is scheduled.

Meanwhile, if a collision occurs, it is preferred that an UL grant is scheduled in an (n+k)-th (k<4) subframe instead of the n-th subframe. For example, if the reception of system information, paging information, or semi-persistent scheduled data in the (n+20)-th subframe is expected as in FIG. 7(b), a BS may schedule an UL grant in an (n+1)-th subframe.

A method of scheduling radio resources for HD-FDD UE is described in detail below.

<Method 1> Limiting the Number of Times of Retransmission

The complexity of the scheduling of radio resources increases depending on the number of times of permitted retransmission. For example, if three times of retransmission are permitted, a BS needs to monitor 20 subframes. If four times of retransmission is permitted, a BS needs to monitor 28 subframes. Accordingly, scheduling overhead for a BS can be reduced by limiting the number of times of retransmission to a specific number. In this case, the number of times of retransmission may be changed semi-statically or dynamically. If the number of times of retransmission is semi-statically changed, this may be indicated through Radio Resource Control (RRC) signaling. If the number of times of retransmission is dynamically changed, this may be included in an UL grant message and transmitted.

<Method 2> Limiting the Number of HARQ Processes

In accordance with a current LTE specification, category-1 UE may perform a maximum of 8 uplink HARQ processes. Since a BS needs to schedule UL transmission by taking HARQ processes into consideration, the scheduling overhead of the BS may be reduced if the number of HARQ processes is limited to one or a small number. To limit the number of HARQ processes may lose a parallelism, or a total data rate of UE may be reduced. In the case of MTC not having a great amount of traffic, however, there is no influence on performance although the number of HARQ processes is limited to one or a small number.

<Method 3> Cross-subframe Uplink Scheduling

Figure 8:
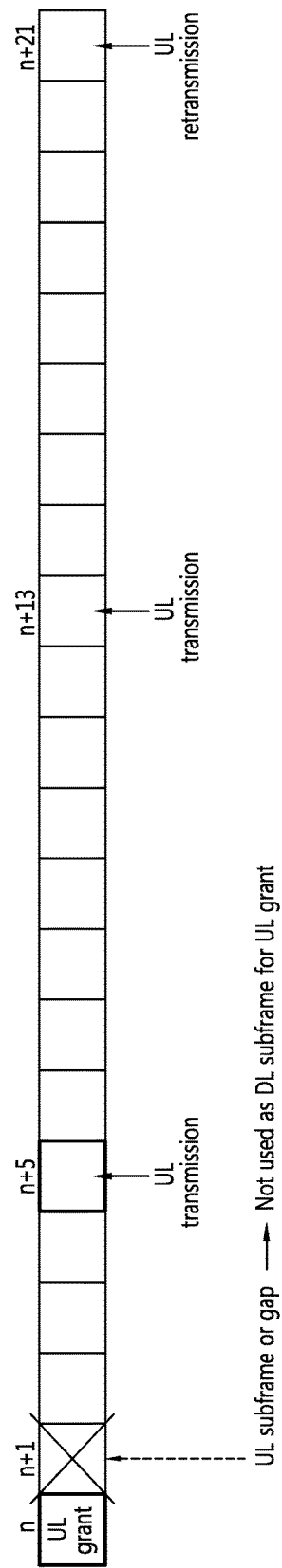
FIG. 8 illustrates the scheduling of radio resources in accordance with an embodiment of the present invention.

FIG. 8 illustrates the scheduling of radio resources in accordance with an embodiment of the present invention.

Referring to FIG. 8, an (n+5)-th subframe, an (n+13)-th subframe, and an (n+21)-th subframe may be scheduled as uplink subframes. If an (n+1)-th subframe has already been scheduled as an uplink subframe or an (n+2)-th subframe has been scheduled as an uplink subframe and the (n+1)-th subframe is used as a gap between a DL subframe and an UL subframe, however, a BS is unable to schedule an UL grant in the (n+1)-th subframe. Accordingly, in accordance with an embodiment of the present invention, a BS schedules an UL grant for (n+5)-th subframe transmission in an n-th subframe. In this case, it is to be noted that the UL grant in the n-th subframe is not for (n+4)-th subframe transmission. This may be called cross-subframe scheduling in that transmission timing is not precisely guaranteed unlike in a common UL grant. That is, a subframe in which UL transmission is performed through cross-subframe scheduling may be indicated as a k-th (k=5, 6, 7, 8) subframe other than a fourth subframe, that is, a subframe in which the UL grant is scheduled.

In accordance with a current LTE specification, in a TDD system, one of two potential UL subframes may be indicated based on the UL index and UL delay of DCI Format 0. In accordance with the aforementioned method, such a concept may be extended in an FDD system.

A subframe in which UL transmission is performed may be indicated by RRC signaling or an UL grant message. For example, if an UL grant is scheduled in an n-th subframe, a BS may indicate a subframe that belongs to {(n+4)-th, (n+5)-th, . . . , (n+4+k)-th (k<4)} subframes and in which UL transmission is performed. In this case, the subframe in which UL transmission is performed may be indicated by offset {0, 1, . . . , k−1} based on the index of the subframe. The offset is expressed in 2 bits {00,01,10,11} when k=3 and is expressed in 1 bit {0,1} when k=1.

<Method 4> Execution of Retransmission Based on an UL Grant (Dynamic HARQ Relaxation)

In a current LTE FDD specification, HARQ timing is defined as a basic value. For example, if an UL grant is scheduled in an n-th subframe and UL transmission is performed in an (n+4)-th subframe, a BS needs to send ACK or NACK for UL transmission through a PHICH in an (n+8)-th subframe. If UL transmission has already been scheduled in the (n+8)-th subframe as in SPS or a CSI report, however, the BS is unable to schedule PHICH transmission in the (n+8)-th subframe. This may also occur in an (n+16)-th subframe in which a second HARQ process may be scheduled.

For such a case, in accordance with an embodiment of the present invention, a retransmission process based on an UL grant is defined. In accordance with the process, a BS disables automatic retransmission based on an HARQ, newly schedules an UL grant, and requests retransmission. In this case, a flag "ACK_NACK_via_Grant" indicative of whether an HARQ process based on an UL grant will be performed may be included in an UL grant message. If the flag is set to 0, existing HARQ-based automatic retransmission is performed. If the flag is set to 1, a grant-based retransmission process is performed.

<Method 5> Indicating Retransmission Timing (Dynamic HARQ RTT)

In a current LTE specification, an interval between initial transmission and retransmission and HARQ Round Trip Time (RTT) are defined as 8 ms. Accordingly, retransmission for initial transmission based on an UL grant is performed in an eighth subframe from a subframe in which initial transmission has been indirectly performed although the initial transmission is not indicated by an HARQ process. That is, it may be said that the subframe in which retransmission is performed has already been determined by the UL grant. If DL reception is scheduled at timing on which retransmission is performed, however, HD-FDD UE has to suspend the retransmission until next available retransmission timing. In order to prevent such scheduling delay, retransmission timing may be indicated. The retransmission timing may be indicated through RRC signaling or an UL grant message.

For example, if an UL grant is scheduled in an n-th subframe, a BS may indicate a subframe that is included in {(n+8)-th, (n+9)-th, . . . , (n+8+r)-th} subframes and in which UL retransmission is performed. In this case, the subframe at which UL transmission is started may be indicated by an offset {0, 1, . . . , r−1} based on the index of the subframe. That is, the BS may determine an offset value compared to 8, that is, a basically set HARQ RTT.

Figure 9:
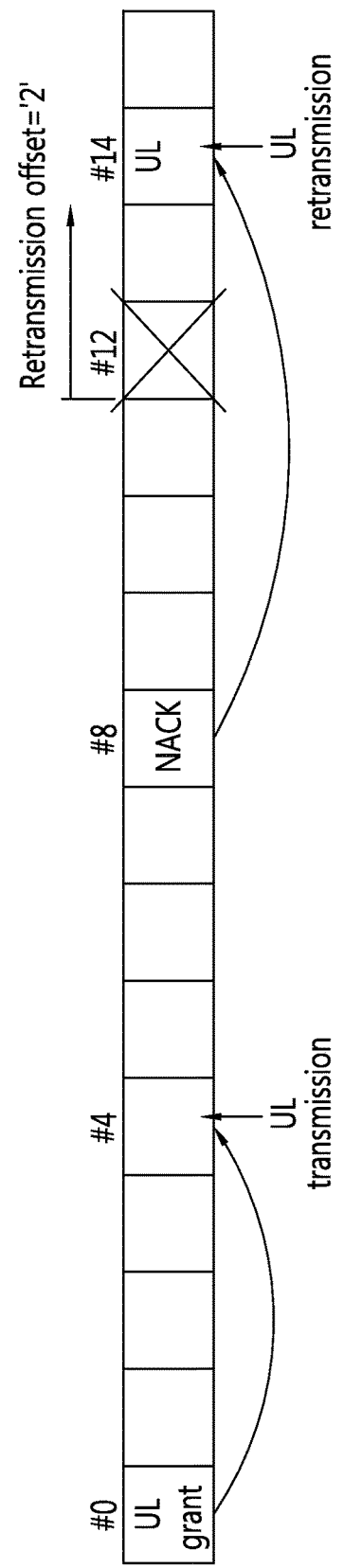
FIG. 9 illustrates the scheduling of radio resources in accordance with an embodiment of the present invention.

FIG. 9 illustrates the scheduling of radio resources in accordance with an embodiment of the present invention.

Referring to FIG. 9, if an UL grant having a retransmission offset value of 2 is scheduled in a #0 subframe, UL transmission is performed in a #4 subframe. A BS sends ACK or NACK for the UL transmission in a #8 subframe. If NACK is received in the #8 subframe, retransmission for the UL transmission is performed in a #14 subframe not in a #12 subframe because the retransmission offset value is 2. In this case, an UL grant for the retransmission in the #14 subframe may be scheduled in a #10 subframe.

Meanwhile, the aforementioned methods may be combined and used. For example, a subframe in which UL transmission is performed through an UL grant and a subframe in which retransmission for the UL subframe is performed may be indicated based on <Method 1> and <Method 5>.

Figure 10:
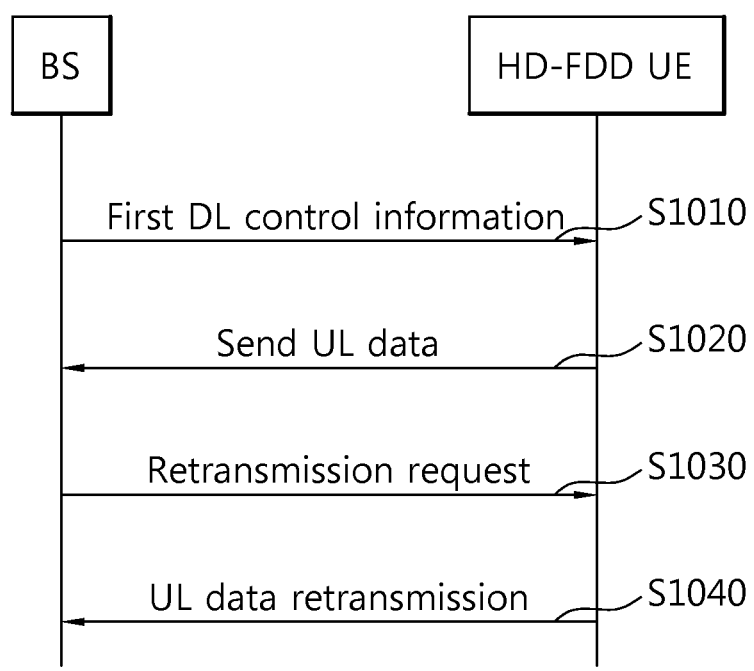
FIG. 10 illustrates a method of transmitting data for a half-duplex device in accordance with an embodiment of the present invention.

FIG. 10 illustrates a method of transmitting data for a half-duplex device in accordance with an embodiment of the present invention. The half-duplex device means UE incapable of performing uplink transmission and downlink reception at the same time as described above.

The half-duplex device receives DL control information from a BS in a first subframe (S1010). In this case, the first subframe may mean timing at which the DL control information is received.

For example, the DL control information may include an UL grant, that is, resource allocation information for the transmission of uplink data (e.g., PUSCH transmission). In this case, downlink data is received through a downlink control channel, such as a PDCCH.

For another example, the DL control information may include information about a second subframe in which the transmission of the uplink data is performed along with the resource allocation information for the transmission of the uplink data. In this case, the second subframe may mean timing at which first uplink data is transmitted like the first subframe.

The half-duplex device sends uplink data to the BS in a second subframe (S1020).

For example, the second subframe may be spaced apart from the first subframe at an interval of 4 ms as in a current LTE specification. That is, the second subframe may be a subframe corresponding to the fourth from the first subframe.

For another example, the second subframe may be spaced apart from the first subframe in a range of 4 ms to 7 ms as described above through <Method 3>. That is, the second subframe may be a subframe corresponding to the fourth to the seventh from the first subframe. The location of the second subframe may be indicated by an offset value based on the index of the first subframe. If an offset of 1 bit is used, the second subframe may be spaced apart from the first subframe at an interval of 4 ms or 5 ms. If an offset of 2 bits is used, the second subframe may be spaced apart from the first subframe at an interval of 4 ms, 5 ms, 6 ms, or 7 ms.

Meanwhile, whether or not to resend the uplink data is determined depending on whether or not the uplink data has been normally transmitted. It is hereinafter assumed that the retransmission of the uplink data is performed because the uplink data has not been normally transmitted.

The half-duplex device receives a retransmission request for the uplink data from the BS in a third subframe (S1030). In this case, the third subframe may mean timing at which the retransmission request is received.

For example, the retransmission request may be based on an HARQ transmitted through a PHICH. In this case, the third subframe is spaced apart from the second subframe at an interval of 4 ms.

For another example, the retransmission request may be based on new DL control information as described above through <Method 4.

Hereinafter, the DL control information received in the first subframe is called first DL control information and the DL control information received in the third subframe is called second DL control information, for convenience of description.

For example, the second DL control information may include resource allocation information for the retransmission of uplink data.

For another example, the second DL control information may include information about a fourth subframe in which the retransmission of the uplink data is performed along with the resource allocation information for the retransmission of the uplink data. In this case, the fourth subframe may mean timing at which the first uplink data is retransmitted.

Meanwhile, the first DL control information may include a flag indicative that the retransmission of the uplink data based on the second DL control information needs to be performed.

The half-duplex device resends the uplink data to the BS in the fourth subframe (S1140).

For example, the fourth subframe may be spaced apart from the third subframe at an interval of 4 ms as in a current LTE specification.

For another example, the fourth subframe may be spaced apart from the third subframe in a range of 4 ms to 7 ms as described above <Method 5>. The location of the fourth subframe may be indicated by an offset value based on the index of the third subframe. If an offset of 1 bit is used, the fourth subframe may be spaced apart from the third subframe at an interval of 4 ms or 5 ms. If an offset of 2 bits is used, the fourth subframe may be spaced apart from the third subframe at an interval of 4 ms, 5 ms, 6 ms, or 7 ms.

To capture cross sub-frame scheduling (CSS) and dynamic HARQ relaxation, we propose the changes in DCI Format 0 as follows.

Option 1: Reuse CFI Field in DCI Format 0: Assuming a low cost MTC device may not utilize carrier aggregation, the idea is to reuse "CFI" (Carrier indicator) field in DCI format 0 as for sub-frame scheduling and HARQ relaxation.

Uplink subframe—2 bits. This field is present for HD-FDD UE for DCI Format 0 and 1A. This field is used for Uplink subframe index between [0, 3] to indicate the subframe where uplink transmission is granted. For instance, Uplink subframe is set to 0 means uplink transmission is granted at n+4$^{th}$ subframe. The value 3 means uplink transmission is granted at n+4+3th subframe. For DCI format 1A, this field is reserved.

ACK_NACK_via_grant—1 bit. This field is present for HD-FDD UE for DCI Format 0 and 1A. This field is used for ACK/NACK process for granted uplink transmission. If this field is set to 1, it indicates that ACK/NACK of the uplink transmission will be sent via a grant and thus the UE is not allowed to perform automatic retransmission. The behaviour of this in case the number of HARQ processes is greater than 1 is described as below. This field is reserved for DCI Format 1A.

Flag for format0/format 1A differentiation—1 bit, where value 0 indicates format 0 and value 1 indicates format 1A Frequency hopping flag—1 bit. This field is used as the MSB of the corresponding resource allocation field for resource allocation type 1.

Resource block assignment and hopping resource allocation—n bits

Modulation and coding scheme and redundancy version—5 bits

New data indicator—1 bit

TPC command for scheduled PUSCH—2 bits

Cyclic shift for DM RS and OCC index—3 bits

UL index—2 bits (this field is present only for TDD operation with uplink-downlink configuration 0)

Downlink Assignment Index (DAI)—2 bits (this field is present only for TDD operation with uplink-downlink configurations 1-6)

CSI request—1 or 2 bits. The 2-bit field only applies to UEs that are configured with more than one DL cell and when the corresponding DCI format is mapped onto the UE specific search space given by the C-RNTI.

SRS request—0 or 1 bit. This field can only be present in DCI formats scheduling PUSCH which are mapped onto the UE specific search space given by the C-RNTI.

Resource allocation type—1 bit

Option 2: Reuse UL Index and DAI Field (TDD-Related Fields): Another potential approach is to reuse UL index and DAI field used in TDD case for HD-FDD UEs. The proposed approach is as follows:

Carrier indicator—0 or 3 bits. This field is present when carrier aggregation is used.

Flag for format0/format 1A differentiation—1 bit, where value 0 indicates format 0 and value 1 indicates format 1A Frequency hopping flag—1 bit. This field is used as the MSB of the corresponding resource allocation field for resource allocation type 1.

Resource block assignment and hopping resource allocation—n bits

Modulation and coding scheme and redundancy version—5 bits

New data indicator—1 bit

TPC command for scheduled PUSCH—2 bits

Cyclic shift for DM RS and OCC index—3 bits

UL index—2 bits. This field is present for HD-FDD UE for DCI Format 0 and 1A. This field is used for Uplink subframe index between [0, 3] to indicate the subframe where uplink transmission is granted. For instance, Uplink subframe is set to 0 means uplink transmission is granted at n+4$^{th}$ subframe. The value 3 means uplink transmission is granted at n+4+3th subframe. For DCI format 1A, this field is reserved.

Downlink Assignment Index (DAI)—2 bits

CSI request—1 or 2 bits. The 2-bit field only applies to UEs that are configured with more than one DL cell and when the corresponding DCI format is mapped onto the UE specific search space given by the C-RNTI.

SRS request—0 or 1 bit. This field can only be present in DCI formats scheduling PUSCH which are mapped onto the UE specific search space given by the C-RNTI.

Resource allocation type—1 bit.

In addition to change existing fields in DCI format 0, we can add two fields for uplink cross-subframe scheduling and ACK_NACK_via_Grant which may require new DCI format for uplink grant.

If dynamic HARQ RTT is used, the invention proposes not to use uplink cross-subframe scheduling and use the field assigned to uplink cross-subframe scheduling for dynamic HARQ RTT.

Figure 11:
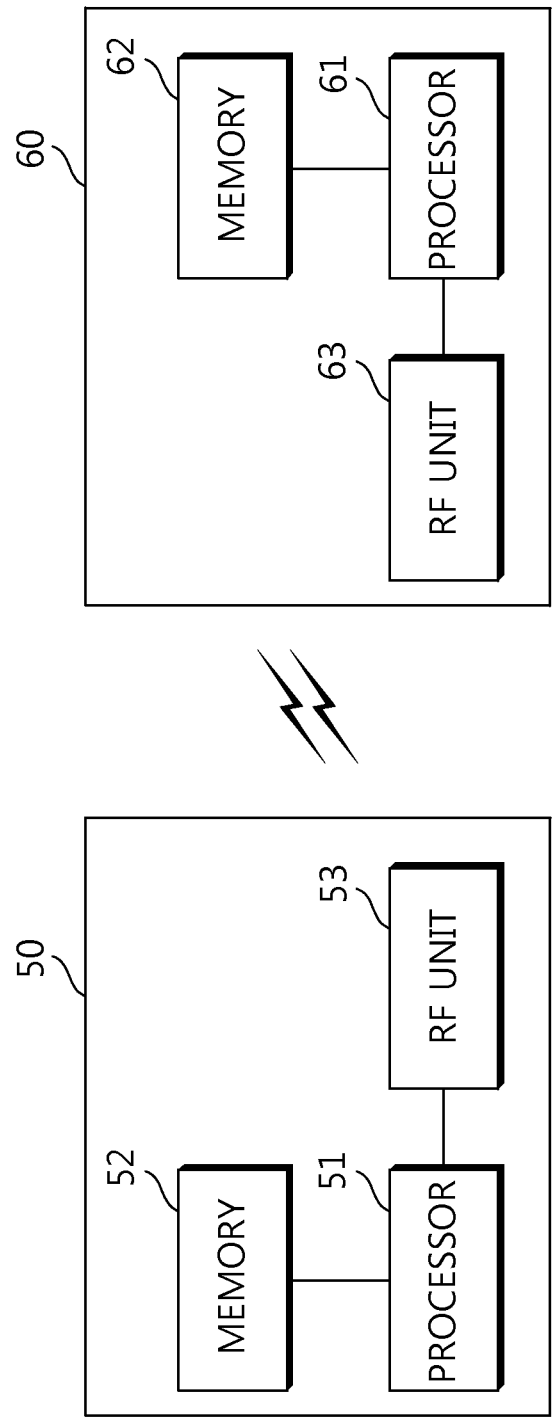
FIG. 11 is a block diagram illustrating a wireless communication system in which an embodiment of the present invention is implemented.

FIG. 11 is a block diagram illustrating a wireless communication system in which an embodiment of the present invention is implemented.

A BS 50 includes a processor 51, memory, 52 and a Radio Frequency (RF) unit 53. The memory 52 is connected to the processor 51 and stores various pieces of information for driving the processor 51. The RF unit 53 is connected to the processor 51 and sends and/or receives radio signals. The processor 51 implements the proposed functions, processes and/or methods. In the aforementioned embodiments, the operation of the BS may be implemented by the processor 51.

UE 60 includes a processor 61, memory, 62 and an RF unit 63. The memory 62 is connected to the processor 61 and stores various pieces of information for driving the processor 61. The RF unit 63 is connected to the processor 61 and sends and/or receives radio signals. The processor 61 implements the proposed functions, processes and/or methods. In the aforementioned embodiments, the operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting data by a half-duplex device in a wireless communication system, the method comprising:

receiving, by the half-duplex device, first downlink (DL) control information from a base station in a first subframe that is an $n^{th}$ subframe, wherein the half-duplex device is a machine type communication (MTC) device;

transmitting, by half-duplex device, uplink data to the base station in a second subframe, wherein the first DL control information includes resource allocation information for the transmission of the uplink data, wherein the first DL control information further includes information related to the second subframe in which the uplink data is transmitted, wherein the second subframe is indicated by an offset value represented by an uplink index of the first subframe, wherein the uplink index represents the offset value, which is from 0 to 3 for indicating a position of the second subframe in which an uplink transmission is granted, and wherein, if the offset value is 0, the second subframe is positioned at an $n+4^{th}$ subframe, if the offset value is 1, the second subframe is positioned at an $n+4+1^{th}$ subframe, if the offset value has 2, the second subframe is positioned at an $n+4+2^{th}$ subframe, and if the offset value is 3, the second subframe is positioned at an $n+4+3^{th}$ subframe;

receiving, by the half-duplex device, a retransmission request for the uplink data from the base station in a third subframe; and retransmitting, by the half-duplex device, the uplink data to the base station in a fourth subframe, wherein the retransmission request includes resource allocation information for the retransmission of the uplink data, wherein the retransmission request further includes information related to the fourth subframes in which the uplink data is retransmitted, wherein a field for the uplink index is present only for the half-duplex device operated in a frequency division duplex (FDD) system for a DL control formation (DCI) format 0 or 1A, and wherein, if the half-duplex device detects that a dynamic hybrid automatic repeat request round trip time (HARQ RTT) is used, the field for the uplink index is used only for an operation of the dynamic HARQ RTT.

2. The method of claim 1, wherein the fourth subframe is indicated by an offset value based on an index of the third subframe.

3. The method of claim 1, wherein the half-duplex device supports a bandwidth of 1.4 MHz.

4. A half-duplex device in a wireless communication system, the device comprising:

a Radio Frequency (RF) unit configured to transmit and receive radio signals; and a processor connected to the RF unit and configured to:

receive first downlink (DL) control information from a base station in a first subframe that is an $n^{th}$ subframe, wherein the half-duplex device is a machine type communication (MTC) device, transmit uplink data to the base station in a second subframe, wherein the first DL control information includes resource allocation information for the transmission of the uplink data, wherein the first DL control information further includes information related to the second subframe in which the uplink data is transmitted, wherein the second subframe is indicated by an offset value represented by an uplink index of the first subframe, wherein the uplink index represents the offset value, which is from 0 to 3 for indicating a position of the second subframe in which an uplink transmission is granted, and wherein, if the offset value is 0, the second subframe is positioned at an $n+4^{th}$ subframe, if the offset value is 1, the second subframe is positioned at an $n+4+1^{th}$ subframe, if the offset value has 2, the second subframe is positioned at an $n+4+2^{th}$ subframe, and if the offset value is 3, the second subframe is positioned at an $n+4+3^{th}$ subframe, receive a retransmission request for the uplink data from the base station in a third subframe, and retransmit he uplink data to the base station in a fourth subframe, wherein the retransmission request includes resource allocation information for the retransmission of the uplink data, wherein the retransmission request further includes information related to the fourth subframe in which the uplink data is retransmitted, wherein a field for the uplink index is present only for the half-duplex device operated in a frequency division duplex (FDD) system for a DL, control formation (DCI) format 0 or 1A, and wherein, if the half-duplex device detects that a dynamic hybrid automatic repeat request round trip time (HARQ RTT) is used, the field for the uplink index is used only for an operation of the dynamic HARQ RTT.

* * * * *